US008113700B2

(12) United States Patent
Hung

(10) Patent No.: US 8,113,700 B2
(45) Date of Patent: Feb. 14, 2012

(54) HEADLAMP WITH HIGH AND LOW BEAM CONTROL DEVICE

(75) Inventor: Kwan-Ten Hung, Tainan (TW)

(73) Assignee: Raiderson Enterprise Co., Ltd., North District, Tainan (TW)

( * ) Notice: Subject to any disclaimer, the term of this patent is extended or adjusted under 35 U.S.C. 154(b) by 280 days.

(21) Appl. No.: 12/616,133

(22) Filed: Nov. 10, 2009

(65) Prior Publication Data

US 2011/0110112 A1 May 12, 2011

(51) Int. Cl.
*B60Q 1/06* (2006.01)

(52) U.S. Cl. ........ 362/539; 362/507; 362/512; 362/191; 362/281; 362/282

(58) Field of Classification Search .................. 362/507, 362/512, 513, 539, 277, 280, 281, 282
See application file for complete search history.

(56) References Cited

U.S. PATENT DOCUMENTS 3,435,200 A * 3/1969 Massoll et al. ................ 362/513
4,298,920 A * 11/1981 Gluck et al. .................. 362/281
5,673,990 A * 10/1997 Neumann et al. ............. 362/513
5,899,559 A * 5/1999 Lachmayer et al. .......... 362/513
6,857,768 B2 * 2/2005 Watanabe et al. ............. 362/512
6,997,590 B2 * 2/2006 Garcia et al. .................. 362/539
7,316,492 B2 * 1/2008 Yamamura et al. ........... 362/539
7,520,649 B2 * 4/2009 Sie ................................ 362/539
2006/0209555 A1 * 9/2006 Kuo et al. ..................... 362/513
2007/0147061 A1 * 6/2007 Lee et al. ...................... 362/513
2009/0059612 A1 * 3/2009 Yang et al. .................... 362/513
2009/0190368 A1 * 7/2009 Smajser et al. ............... 362/539
2010/0142216 A1 * 6/2010 Huang et al. .................. 362/512

FOREIGN PATENT DOCUMENTS

EP 294589 A2 * 12/1988

* cited by examiner

*Primary Examiner* — Ismael Negron

(57) ABSTRACT

A headlamp includes a lamp base with an interior reflecting surface, a lamp provided in the lamp base, a driver deposited on a recessed supporting surface of the lamp base, two light shields installed on the lamp base and a spring biasing the lamp shields towards one another. The driver includes a driving shaft, and a pushing block with a conical surface gradually tapered toward its free end. The light shields are pivotally fixed on the lamp base by fastening elements and their inner portions overlapped each other, and each has a sliding groove bored obliquely and tapered downwards for the pushing block to pass through. The light shields are drawn by the driver to control light projecting from the lamp to produce a high and low beam illumination pattern.

3 Claims, 6 Drawing Sheets

HEADLAMP WITH HIGH AND LOW BEAM CONTROL DEVICE

BACKGROUND OF THE INVENTION

1. Field of the Invention

This invention relates to a control device of a headlamp's high and low beam, particularly to one employing a driver to enable two light shields to swing up or down to control the projecting scope of light emitted by a headlamp, so as to obtain a high or a low beam of the automobile's headlamp.

2. Description of the Prior Art

Commonly, an automobile's headlamps can be switched to have a high or a low beam by swinging it to different angles. However, power lines of the headlamp are apt to be damaged by friction caused between them and the bases of the headlamps while rotating the headlamp.

SUMMARY OF THE INVENTION

The object of this invention is to offer a control device of a headlamp's high and low beam, which can control the light projecting scope without rotating a lamp base of a headlamp to alter the projecting angle.

The main characteristics of the invention are a lamp base, a driver, two light shields and a spring.

The lamp base is provided with a supporting surface formed on an outside, a projecting edge formed around the circumference of the lamp base, a recess cut at one side of the projecting edge, two projecting bars correspondingly planted on the projecting edge, an arc-like reflecting surface formed inside the lamp base, and a lamp installed inside the lamp base.

The driver is deposited on the supporting surface of said lamp base, provided with a driving shaft, a pushing block located at a free end of the driving shaft to correspond to the recess of the lamp base, and a conical surface formed around the pushing block and gradually tapered toward its free end.

The light shields are correspondingly installed on the lamp base, respectively provided with a through hole bored correspondingly in an outer edge. Furthermore, the light shields are overlapped with their inner portions, respectively provided with a sliding groove bored obliquely and tapered downwards in their overlapping portions for the pushing block of the driver to penetrate through.

The spring is installed on the light shields.

BRIEF DESCRIPTION OF DRAWINGS

This invention is better understood by referring to the accompanying drawings, wherein.

DETAILED DESCRIPTION OF THE PREFERRED EMBODIMENT

Figure 1:
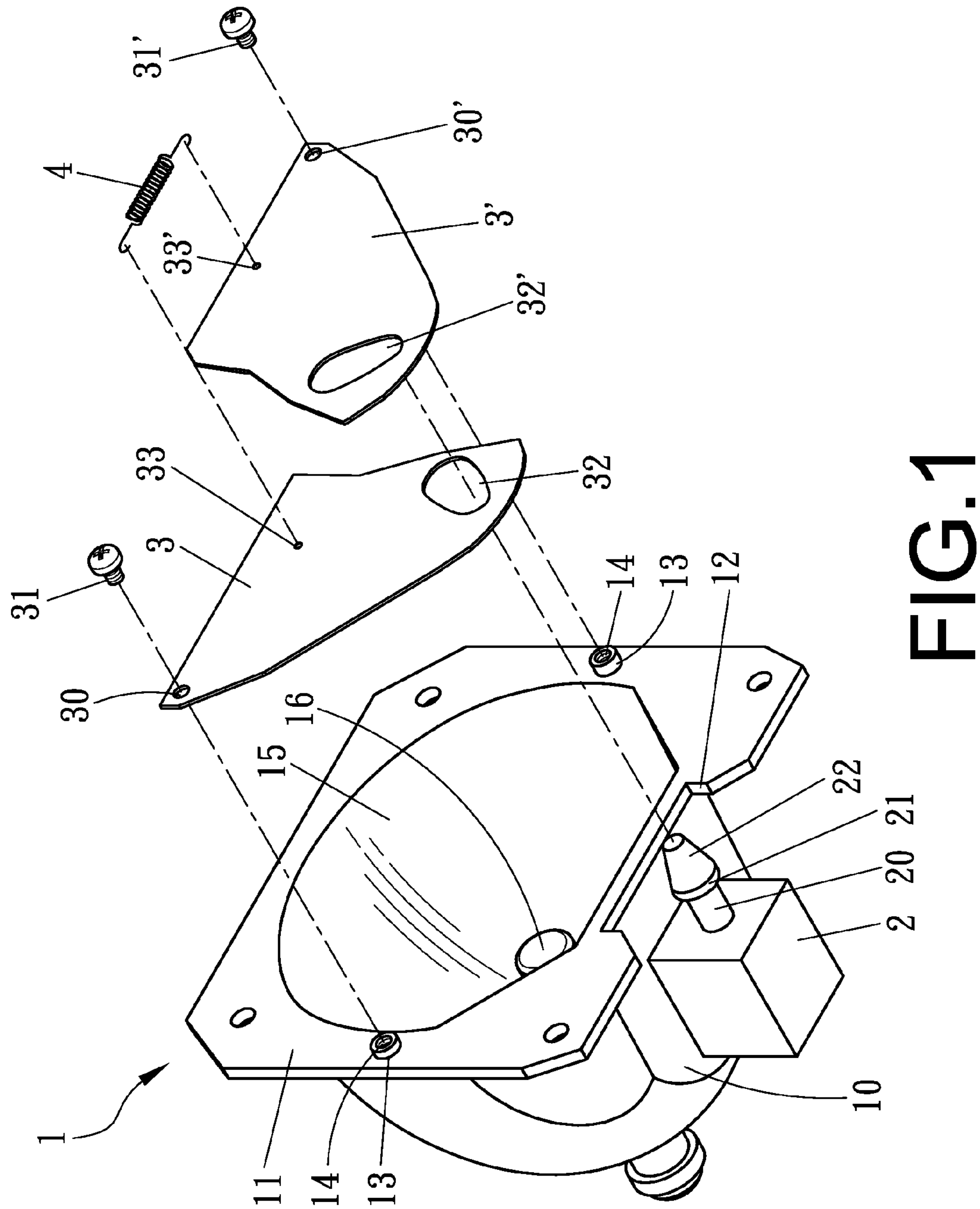
FIG. 1 is an exploded perspective view of a preferred embodiment of a control device of a headlamp's high and low beam in the present invention.
Figure 2:
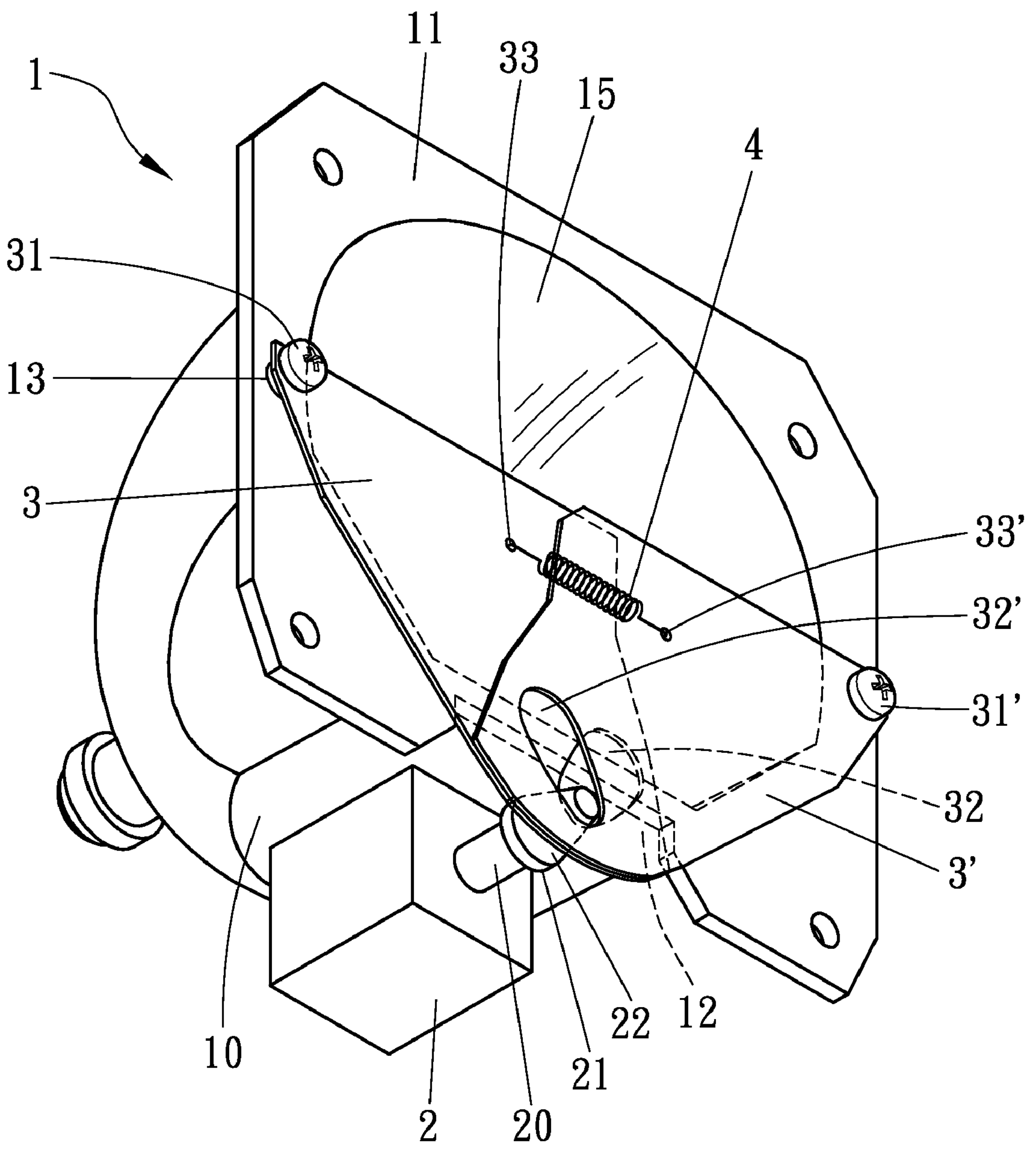
FIG. 2 is a perspective view of the preferred embodiment of a control device of a headlamp's high and low beam in the present invention.
Figure 3:
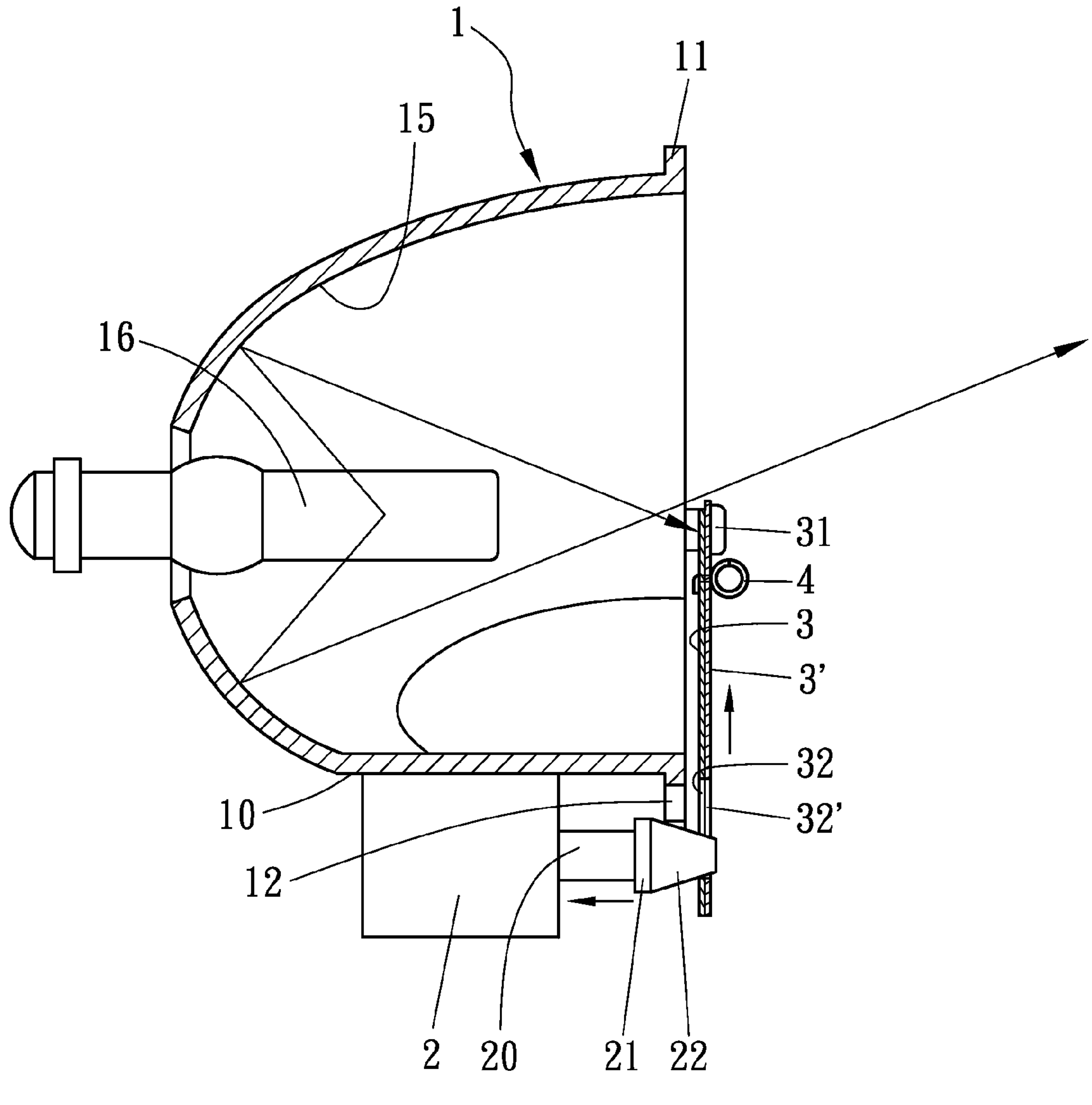
FIG. 3 is a cross-sectional view of the preferred embodiment of a control device of a headlamp's high and low beam in the present invention, showing it being switched to reflect a low beam.

As shown in FIGS. 1~3, a preferred embodiment of a control device of a headlamp's high/low beam in the present invention includes a lamp base 1, a driver 2, two light shields 3 and 3', and a spring 4.

The lamp base 1 is provided with a supporting surface 10 formed on the outside, a projecting edge 11 formed around the circumference, a recess 12 cut at one side of the projecting edge 11 to correspond to the supporting surface 10, two projecting bars 13 respectively planted on two corresponding sides of the projecting edge 11, a threaded hole 14 formed in each of the projecting bars 13, an arc-like reflecting surface 15 formed inside, and a lamp 16 installed inside.

The driver 2 is deposited on the supporting surface 10, provided with a driving shaft 20, a pushing block 21 located at a free end of the driving shaft 20, and a conical surface 22 formed around the pushing block 21 and gradually tapered toward its free end.

The light shields 3 and 3' are correspondingly installed on the lamp base 1, respectively provided with a through hole 30 or 30' correspondingly bored in an outer edge, and a fastening element 31 and 31' respectively inserted through the through holes 30 and 30' to be threadably coupled with the threaded holes 14 and 14'. Furthermore, the light shields 3 and 3' are overlapped with their inner portions, respectively having a sliding groove 32 or 32' bored obliquely and tapered downwards for the pushing block 21 of the driver 2 to penetrate through, and a locking hole 33 or 33'.

The spring 4 is installed on the two light shields 3 and 3'.

In assembling, as shown in FIGS. 1~4, the driver 2 is first fixed on the supporting surface 10 of the lamp base 1, with the pushing block 21 positioned within the recess 12 of the lamp base 1. Next, the light shields 3 and 3' are overlapped, with the bottoms of the sliding grooves 32 and 32' coinciding with each other and inserted by the pushing block 21 of the driver 2, and the through holes 30 and 30' respectively corresponding to one of the threaded holes 14 in the projecting bars 13 of the lamp base 1. Then, the fastening elements 31 and 31' are respectively inserted through the through holes 30 and 30' to be threadably engaged with the threaded holes 14, so as to keep the light shields 3 and 3' positioned on the lamp base 1. Finally, two ends of the spring 4 are hooked in the locking holes 33 and 33'. Thus, the assembly of the control device of the invention is finished.

Figure 6:
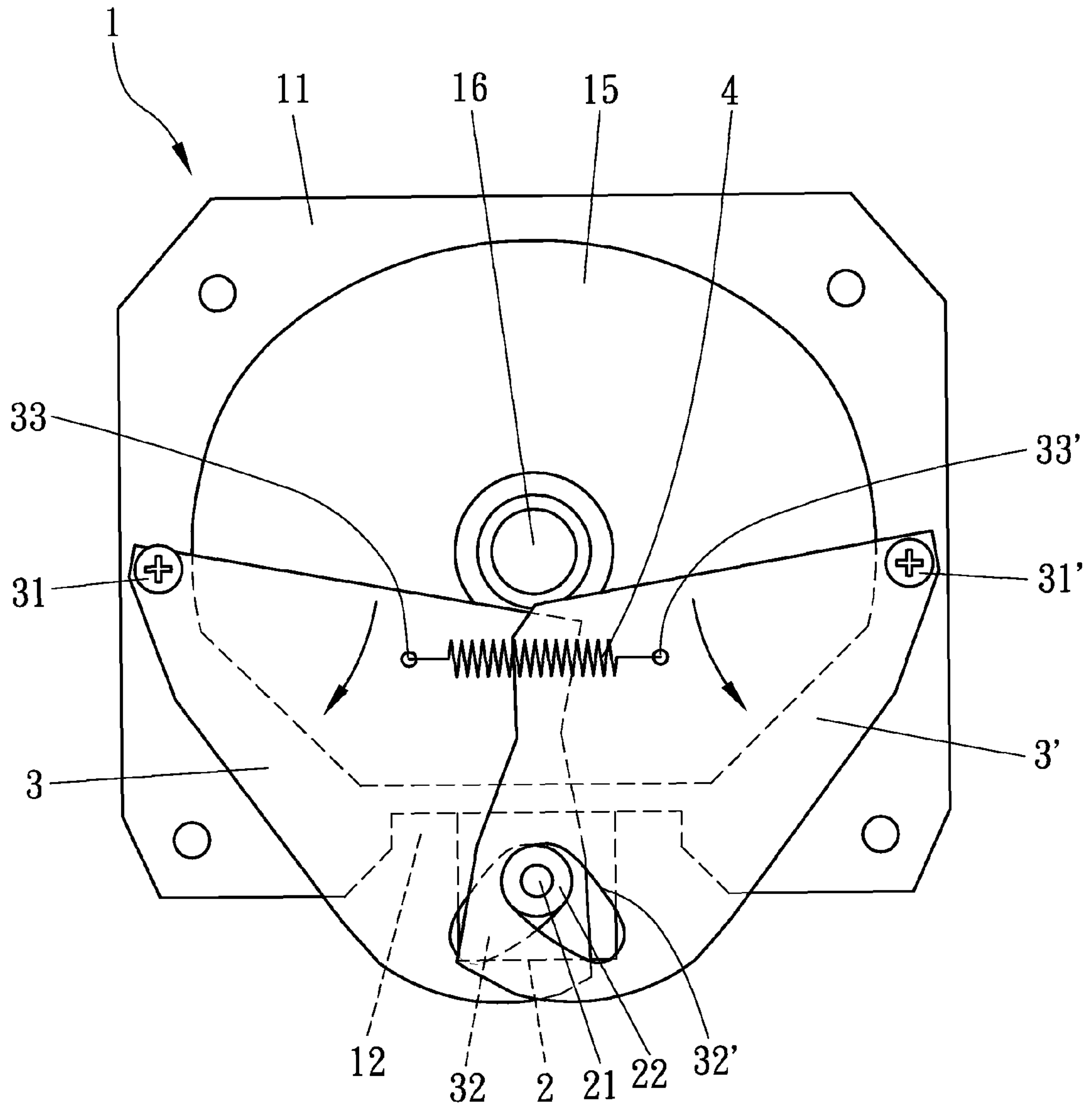
FIG. 6 is a front view of the preferred embodiment of a control device of a headlamp's high and low beam in the present invention, showing it being switched to reflect a high beam.

In operating, as shown in FIGS. 3~6, when the headlamp is expected to work with a high beam, the driver 2 can be electrically started to drive the driving shaft 20 to move forward. By the time, the pushing block 21 is to be vertically moved forward in the sliding grooves 32 and 32' of the light shields 3 and 3'. With the fastening elements 31 and 31' functioning as swinging axes of the light shields 3 and 3', the conical surface 22 of the pushing block 21 is to force the top of the sliding grooves 32 and 32' (the portion with a widest diameter) to move toward it, thus enabling the light shields 3 and 3' to swing downward, as shown in FIG. 6. The spring 4 is simultaneously stretched out elastically. So, the light emitted by the lamp 16 can project with a wider angle after being reflected by the reflecting surface 15 as it is not sheltered by the light shields 3 and 3'. A high beam is therefore obtained.

Figure 4:
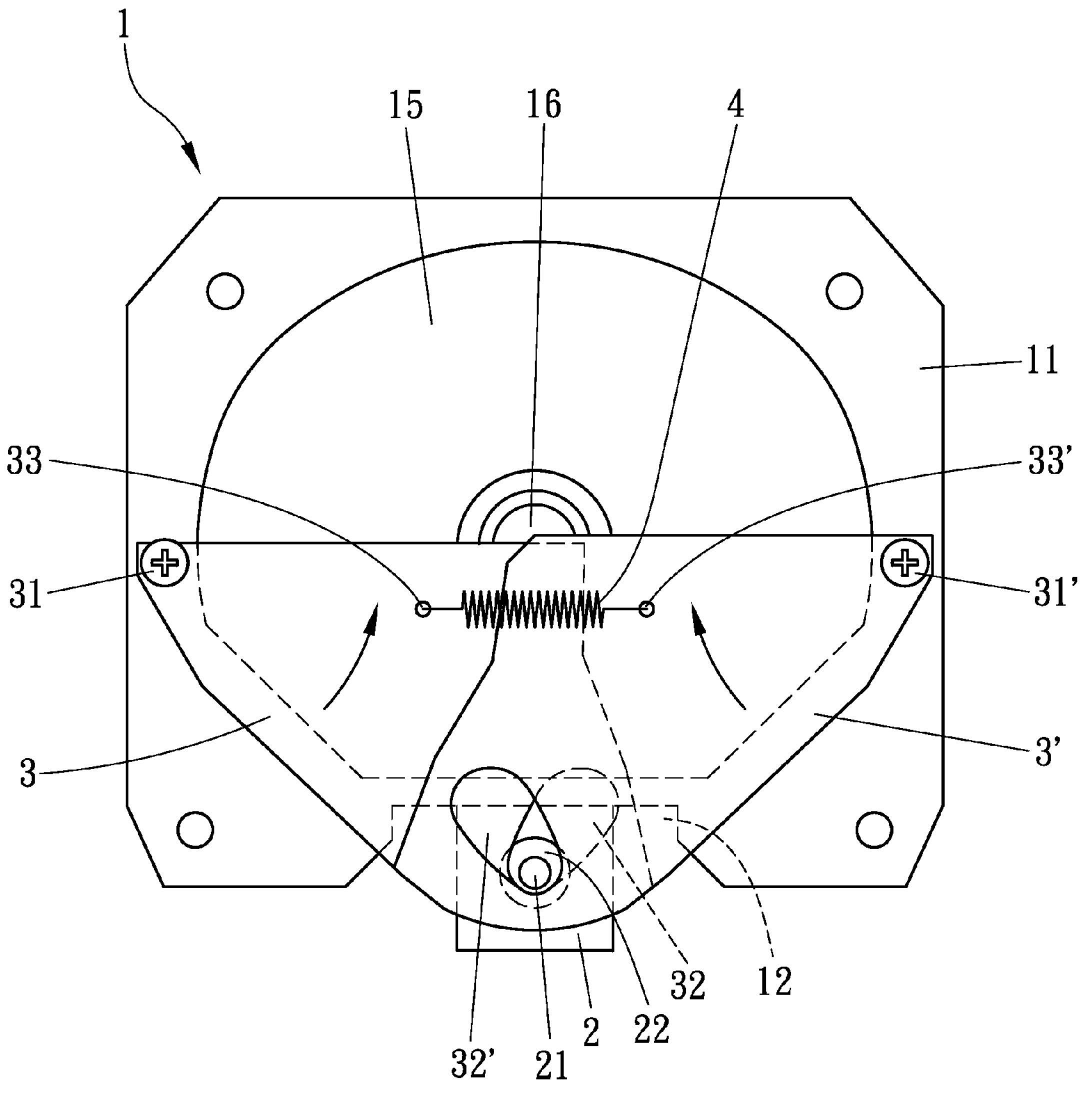
FIG. 4 is a front view of the preferred embodiment of a control device of a headlamp's high and low beam in the present invention, showing it being switched to reflect a low beam.
Figure 5:
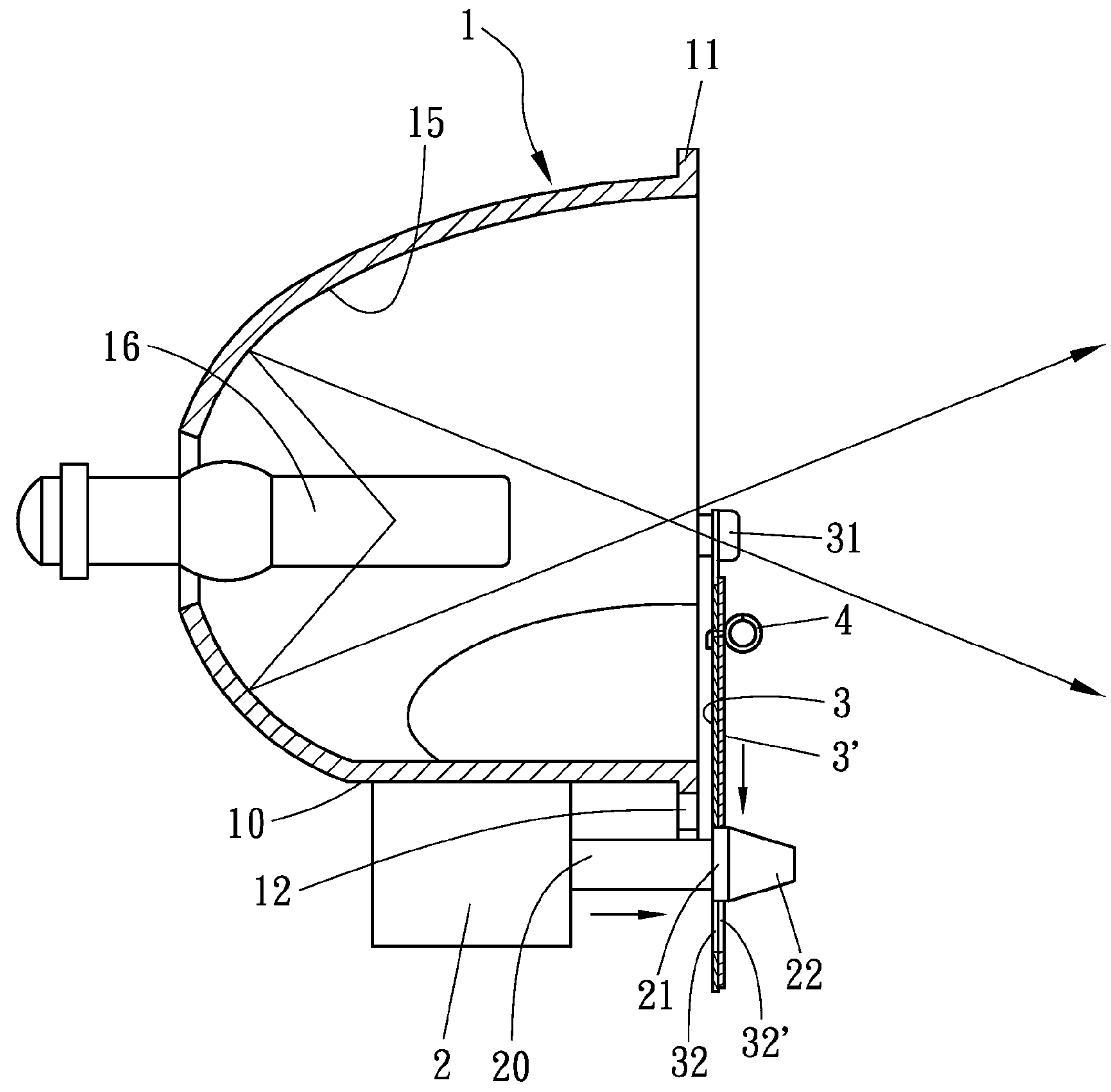
FIG. 5 is a cross-sectional view of the preferred embodiment of a control device of a headlamp's high and low beam in the present invention, showing it being switched to reflect a high beam.

On the contrary, if the headlamp is expected to work with a low beam, the driver 2 can be reversely started to drive the driving shaft 20 to move backward. By the time, the pushing block 21 is to be moved backward to its original position, keeping the wider portion of the conical surface 22 from staying in the sliding grooves 32 and 32' of the light shields 3 and 3', so that the light shields 3 and 3' are to be swung upward owing to elastic contraction of the spring 4, as shown in FIG. 4. With corresponding inner portions of the light shields 3 and 3' moved up to their original positions, light emitted by the lamp 16 and reflected by the reflecting surface 15 can only project out partially as some of it is sheltered by the light shields 3 and 3', as shown in FIG. 3. Thus, a low beam is gained. By means of the driver 2 to draw the light shields 3 and 3', the headlamp can be controlled to switch between a high and a low beam without necessity of rotating the lamp base 1, able to lengthen service life of a lamp.

While the preferred embodiment of the invention has been described above, it will be recognized and understood that various modifications may be made therein and the appended claims are intended to cover all such modifications that may fall within the spirit and scope of the invention.

What is claimed is:

1. A headlamp with high and low beam control, such headlamp comprising:

a lamp base provided with a supporting surface formed on an outside, a projecting edge formed around a circumference of said lamp base, a recess cut at one side of said projecting edge, two projecting bars correspondingly planted on said projecting edge, an arc-like reflecting surface formed inside said lamp base, a lamp installed inside said lamp base;

a driver deposited on said supporting surface of said lamp base and provided with a driving shaft, a pushing block located at a free end of said driving shaft, a conical surface formed around said pushing block and gradually tapered toward a free end, said pushing block located corresponding to said recess of said lamp base;

two light shields correspondingly installed on said lamp base and respectively provided with a through hole bored correspondingly in an outer edge, said light shields partially overlapped with each other, a sliding groove bored obliquely and tapered downwards in an overlapping portion of each of said light shields for said pushing block of said driver to penetrate through; and a spring installed on said light shields to bias them against each other.

2. The headlamp with high and low beam control as claimed in claim 1, wherein said lamp base is further provided with a threaded hole bored in each of said projecting bars for being threadably engaged with a said fastening element that is previously inserted through said through hole of said light shields.

3. The headlamp with high and low beam control as claimed in claim 1, wherein each of said light shields is bored with a locking hole for being hooked by said spring.

* * * * *